United States Patent [19]
Hamy et al.

[11] Patent Number: 5,125,003
[45] Date of Patent: Jun. 23, 1992

[54] BOTTOM ELECTRODE COOLED SLEEVE FOR A METALLURGICAL CONTAINER

[75] Inventors: Michel Hamy, Strasbourg; Ghislain Maurer, Chatel Saint Germain; Christian Lebrun, Valenciennes; Jean-Claude Grosjean, Metz, all of France

[73] Assignee: Francaise Institut De Recherches De La Siderurgie, Puteaux, France

[21] Appl. No.: 595,046

[22] Filed: Oct. 10, 1990

[30] Foreign Application Priority Data

Oct. 11, 1989 [FR] France .................. 89 13636

[51] Int. Cl.⁵ ............................................. H05B 7/10
[52] U.S. Cl. ......................................... 373/94; 373/72; 373/36; 373/37; 373/38; 373/95; 373/96; 373/93; 373/88
[58] Field of Search ............. 373/101, 72, 92, 93, 373/94, 95, 108, 37, 90, 36, 38, 88, 71, 120, 48, 55, 96

[56] References Cited

U.S. PATENT DOCUMENTS

| | | | |
|---|---|---|---|
| 4,646,316 | 2/1987 | Michelet et al. | 373/72 |
| 4,685,112 | 8/1987 | Michelet et al. | 373/72 |
| 4,730,338 | 3/1988 | Guido | 373/108 |
| 4,982,411 | 1/1991 | Michelet et al. | 373/72 |

FOREIGN PATENT DOCUMENTS

| | | | |
|---|---|---|---|
| 0044512 | 7/1981 | European Pat. Off. | |
| 0133931 | 7/1984 | European Pat. Off. | |
| 0133925 | 3/1985 | European Pat. Off. | 373/101 |
| 0203301 | 3/1986 | European Pat. Off. | |
| 0309583 | 6/1987 | European Pat. Off. | |
| 3835785 | 5/1989 | Fed. Rep. of Germany | 373/94 |
| 2437760 | 4/1980 | France | |
| 2577311 | 8/1986 | France | |
| 2566984 | 12/1986 | France | |
| 2572873 | 12/1988 | France | |
| 2621994 | 4/1989 | France | 373/93 |
| 0126094 | 5/1990 | Japan | 373/94 |
| 452730 | 4/1966 | Switzerland | |

Primary Examiner—Bruce A. Reynolds
Assistant Examiner—Tu Hoang
Attorney, Agent, or Firm—Fay, Sharpe, Beall, Fagan, Minnich & McKee

[57] ABSTRACT

The electric connection device comprises an electrode (5), a sleeve (19) mounted around a projecting end part (8) of the electrode (5), and an arrangement for cooling the sleeve (19) with a cooling fluid comprising at least one system (20, 20') of nozzles (21) spraying cooling fluid onto the outer surface of the sleeve (19).

8 Claims, 1 Drawing Sheet

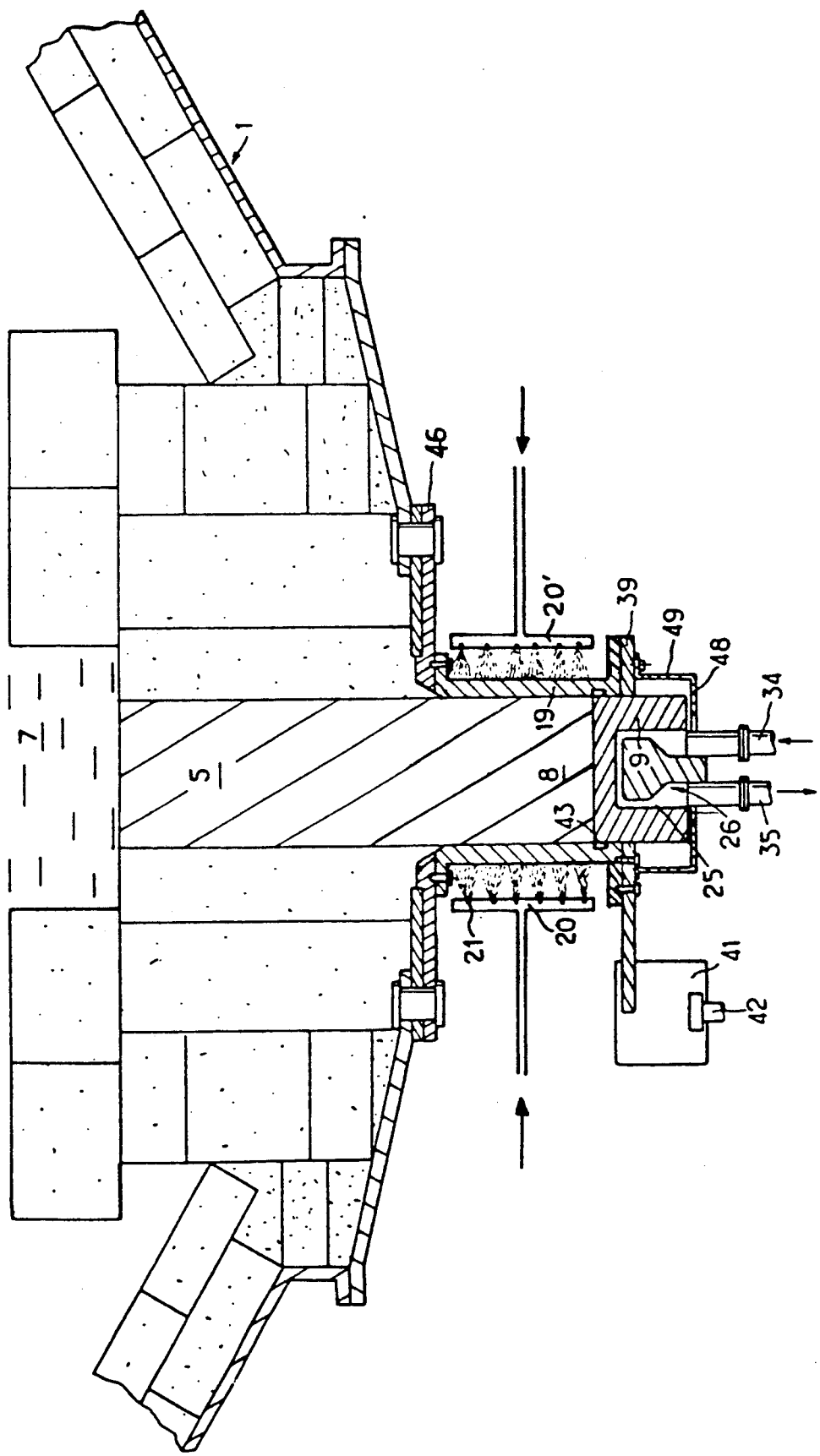

BOTTOM ELECTRODE COOLED SLEEVE FOR A METALLURGICAL CONTAINER

BACKGROUND OF THE INVENTION

1. Field of the Invention

The present invention relates to an electric connection device intended to be placed in the wall of a metallurgical container and put in contact, by one of its ends, with a mass of molten metal contained in the container, the other end, cooled by a fluid, extending out of the wall of the container and being connected to a terminal of an electric supply.

2. Description of the Related Art

A device of this type, disclosed in the document FR-A-2,566,984, comprises a sleeve composed of a material which is a good heat conductor, such as copper, mounted around the projecting and cooled end in contact with a circulating fluid. The cooling means for the sleeve disclosed in this document are preferably constituted by at least one groove provided in the outer lateral surface of the sleeve, in which the cooling fluid circulates, and a jacket closing said groove and disposed around the sleeve, said jacket being provided with fluid inlet and outlet means which are connected to the ends of the groove and are also connected to a cooling fluid supply.

As an alternative, the grooves may be replaced by channels provided inside the sleeve, but this solution has the drawback of requiring a delicate machining of the sleeve. The previously-described solution consequently remains the preferred one according to the cited document.

Another solution disclosed in the document FR-A-2,621,994, comprises providing the groove or grooves, not in the sleeve but in the inner lateral surface of the jacket. The cost of the sleeve which no longer has to be machined may in this way be reduced without correspondingly reducing the effectiveness of the cooling means. The machining of the groove therefore has only to be carried out once in a part which does not undergo wear, which distinctly reduces the cost of the use of the electrode.

An object of the invention is to propose a manner of cooling the sleeve which simplifies the overall construction of the electrode compared with the arrangements just described.

SUMMARY OF THE INVENTION

The invention therefore provides an electric connection device intended to be placed in the wall of a metallurgical container or furnace containing a molten metal mass, said device comprising:

an elongated metal body intended to be inserted in and extend through the wall of the container so that one of its ends is put in contact with the molten metal and the other end constitutes an end part projecting outside the container and connected to a terminal of an electric supply;

a sleeve composed of a material which is a good heat conductor mounted concentrically with the projecting end part of the body;

and means for cooling the sleeve with a cooling fluid, such as water;

said device being characterized in that said sleeve cooling means comprise at least one rack of nozzles which spray the cooling fluid onto the outer wall of the sleeve.

As will have been understood, the invention consists in cooling the electrode by a simple spraying of this fluid onto the sleeve with no confinement of the circulation of the fluid.

BRIEF DESCRIPTION OF THE DRAWINGS

A better understanding of the invention will be had from the following description with reference to the accompanying FIG. 1 which represents a vertical sectional view of a d.c. arc furnace provided with a device according to the invention.

DESCRIPTION OF THE PREFERRED EMBODIMENT

For a more complete description of some details of the electric connection device which are shown in the Figure but are not characteristics of the invention, reference may be made if required to the aforementioned document FR-A-2,566,984 and to the document FR-A-2,577,311 or FR-A-2,572,873. It will merely be recalled that an elongated metal body or bar 5 whose upper end is in contact with the molten metal 7 extends through the bottom 1 of the furnace. The end part 8 of the bar 5 extends beyond the end of the furnace and is surrounded by a cooled sleeve 19. A terminal member 9 composed of a cooled heat conductive material extends the end part 8.

The terminal member 9 defines a cavity 25 in which is disposed a cooling system 26 connected to an inlet 34 and an outlet 35 of cooling fluid.

In the illustrated embodiment, an electric connection plate 39 is connected by at least one fin 41 to a cable 42 connected to a terminal of an electric supply. Contacts 43, of the "spring blade" type, electrically connect the sleeve 19 to the terminal member 9.

It may be mentioned that the electric connection between the supply and the terminal member 9 could also be achieved directly without connection of the sleeve 19 to this supply.

A thrust-ring 48, retained below the terminal member 9 by arms 49 fixed under the plate 39, may be provided.

In its upper part, the sleeve is maintained connected to the shell of the furnace, for example by fixing it against a bottom plate 46 which may be a plate composed of a non-conductive material so that it insulates the electrode from the shell of the furnace.

According to the invention, the circulation of cooling fluid cooling the sleeve 19 is achieved by means of racks 20, 20' of nozzles 21 which spray the fluid, for example water under high pressure, onto the outer wall of the sleeve in the form of fine droplets. This type of cooling is termed "by pulverization". The cooling fluid may be mixed with air. It is then termed "cooling by atomization". The number and arrangement of the racks and of the nozzles must be so calculated as to ensure a homogeneous cooling of the sleeve throughout its periphery. Further, as in the other cooling devices previously envisaged for this type of electrode, this cooling must be sufficiently intense to avoid the complete melting of the bar 5 and in particular to ensure that the molten front does not reach the terminal member 9. In this way, seeping of liquid metal out of the furnace can be avoided.

The whole of the device is enclosed in a case (not shown in FIG. 1) whose function is to insulate it from the outer medium, which avoids formation of a mist around the furnace, and to collect and discharge the cooling fluid after its contact with the bar.

Owing to the presence of the sleeve, it is possible to ensure a very homogeneous cooling of the bar. The sleeve also has for function to support the bar and in this way ensure that the solidified crust of the bar does not break away above the molten front and allow liquid metal to escape if the cooling fluid is unable to maintain it sufficiently rigid.

The calculation of the amount of heat to be extracted from the sleeve and the determination of the number and characteristics of the nozzles and of the rate of flow of cooling fluid required for this purpose are part of the general knowledge of the person usually in charge of the operation of this general type of bottom electrode. As a result of the more intimate contact between the fluid and the surface to be cooled such a device achieves, it permits removing larger amounts of heat than the devices employing a confined circulation of fluid heretofore employed.

It must be understood that the scope of the invention is not intended to be limited to the embodiment just described and represented, in which the sleeve and the bar are in constant contact. The cooling device according to the invention is also applicable to the electrodes disclosed in the documents FR-A-2,572,873 and FR-A-2,577,311, in which a separating gap is provided in the cold state between the bar and the sleeve. This gap is filled only after the bar has undergone a certain expansion subsequent to putting the electrode in service. Consequently, the forces exerted by the sleeve on the bar are reduced and the life of the sleeve is prolonged.

Furthermore, the terminal member 9 may also be cooled by means of nozzles, this cooling being added to or substituted for the cooling by circulation of fluid inside the terminal member previously described and represented.

What is claimed is:

1. An electric connection device for placement in a wall of a metallurgical container containing a molten metal mass, said device comprising:
   an elongated metal body for inserting in said wall, said body extending through said wall, a first end of said body contacting said molten metal mass and a second end of said body projecting out of said wall for connection to an electric supply terminal;
   a sleeve, having an inner surface and an outer surface, mounted concentrically about said second end of said body, said sleeve being composed of a material which is a good heat conductor; and,
   cooling means for cooling said sleeve with a cooling fluid, said cooling means comprising at least one system of nozzles, located outside said sleeve, for spraying said cooling fluid onto said outer surface of said sleeve.

2. The device according to claim 1, wherein said cooling fluid is water.

3. The device according to claim 1, further comprising a gas mixed with said cooling fluid.

4. The device according to claim 3, wherein said gas is air.

5. The device of claim 1 wherein said cooling means cools said sleeve in a homogeneous manner.

6. An electric connection device for use in furnaces, said device mounted in a wall, floor or ceiling of a furnace, when inserted into said furnace said device comprising:
   an elongated metal body, said body having first and second ends, said first end contacting molten metal within said furnace, said second end projecting outwardly from said furnace and being connected to an electric supply terminal;
   a sleeve having inner and outer surfaces, said sleeve being in thermal contact with said second end of said elongated metal body and being made of a material having good thermal conductivity, said sleeve being mounted concentrically about said second part of said body; and,
   cooling means located outside said sleeve, for cooling an outer surface of said sleeve with a cooling fluid, said cooling means comprising at least one system of nozzles for spraying said cooling fluid to cool all parts of said outer surface of said sleeve substantially equally, said cooling means thereby homogeneously cooling said sleeve and said second end of said body.

7. The device of claim 6 wherein said sleeve has a smooth inner surface.

8. The device of claim 7 wherein aid sleeve has a smooth outer surface.

* * * * *